(12) United States Patent
Mikesell et al.

(10) Patent No.: US 8,820,711 B2
(45) Date of Patent: Sep. 2, 2014

(54) SEAL SYSTEM

(71) Applicants: Kenneth W. Mikesell, Arvada, CO (US); Darryl Ray Pauls, Visalia, CA (US)

(72) Inventors: Kenneth W. Mikesell, Arvada, CO (US); Darryl Ray Pauls, Visalia, CA (US)

(73) Assignee: Waterman Industries, Inc., Exeter, CA (US)

( * ) Notice: Subject to any disclaimer, the term of this patent is extended or adjusted under 35 U.S.C. 154(b) by 0 days.

(21) Appl. No.: 13/651,087

(22) Filed: Oct. 12, 2012

(65) Prior Publication Data

US 2013/0092862 A1     Apr. 18, 2013

Related U.S. Application Data

(60) Provisional application No. 61/627,504, filed on Oct. 13, 2011.

(51) Int. Cl.
*F16K 3/00* (2006.01)
*F16K 3/316* (2006.01)
*F16K 3/02* (2006.01)

(52) U.S. Cl.
CPC ............... *F16K 3/0227* (2013.01); *F16K 3/316* (2013.01); *F16K 3/0281* (2013.01)
USPC ........... 251/328; 251/333; 251/364; 405/105; 49/489.1; 49/490.1; 49/495.1; 277/642; 277/644

(58) Field of Classification Search
USPC ................ 251/193, 326, 328, 332, 333, 364; 49/489.1, 490.1, 495.1; 405/103–106; 277/642, 644
See application file for complete search history.

(56) References Cited

U.S. PATENT DOCUMENTS

| | | | |
|---|---|---|---|
| 3,213,584 A * | 10/1965 | Bush | ............................ 277/649 |
| 3,760,593 A | 9/1973 | Whipps | |
| 4,028,896 A | 6/1977 | Whipps | |
| 4,226,533 A | 10/1980 | Snowman | |
| 4,848,962 A | 7/1989 | Whipps | |
| 5,141,361 A | 8/1992 | Fontaine | |
| 6,176,493 B1 | 1/2001 | Whipps | |

OTHER PUBLICATIONS

U.S. Appl. No. 61/627,504, filed Oct. 13, 2012.

\* cited by examiner

*Primary Examiner* — John K Fristoe, Jr.
*Assistant Examiner* — Marina Tietjen
(74) *Attorney, Agent, or Firm* — Craig R. Miles; CR Miles P.C.

(57) ABSTRACT

A slide gate having a frame assembly including an intermediate cross member coupled between a first and second gate guide members defining a corresponding pair of side channel elements each containing an elongate side seal which abut opposed ends of an elongate top seal secured to the intermediate cross member to seal a gate slidely engaged in the pair of side channel elements.

11 Claims, 6 Drawing Sheets

SEAL SYSTEM

This United States Non-Provisional Patent Application claims the benefit of U.S. Provisional Patent Application No. 61/627,504, filed Oct. 13, 2012, hereby incorporated by reference herein.

I. BACKGROUND

A slide gate for controlling fluid flow having improved slide gate seals.

Conventional slide gates are employed to control fluid flow through a passageway or channel. Conventional slide gates typically provide a frame assembly which defines an opening through which fluid flows, a gate slidely mounted to the frame assembly, and a gate operating means for generating movement in the gate between an open position and a closed position for regulating fluid flow through the opening.

As to particular conventional slide gates, the frame assembly can be mounted to walls which define a passageway or channel through which the fluid flows such that substantially all of the fluid flows through the opening in the frame assembly. In this way, fluid flow through the opening of the gate can be regulated by the position of the gate within the frame assembly. Conventional slide gates and their sealing members are shown in U.S. Pat. Nos. 3,760,593; 4,028,896; 4,226,533; 4,848,962, 5,141,361 and 6,176,493.

Conventional slide gate seals provide a seal between the gate slidely mounted to the frame assembly. Typically, a horizontal frame member of the frame assembly supports a top seal in facing relation to a corresponding first face of the gate, a bottom horizontal frame member provides a bottom channel which supports within a bottom seal in facing relation to the bottom edge of the gate, and a pair of vertical frame members each provide a side channel which supports within a corresponding one of a pair of side seals each side seal having a pair of seal members disposed to contact opposing faces of the gate.

Conventional top seals may have a rectangular shape bounded by four sides adapted to provide a pair faces. All or a portion of the surface area of the pair of faces can be disposed in facing relation to contact a corresponding portion of the surface of the gate. To increase the tightness of the top seal the sealing face can be defaulted by forcible urging to press against the face of gate. However, these conventional top seals when engaged with the face of the gate have substantial frictional drag which must be overcome by a substantially greater lifting force in operation of the slide gate.

Additionally, conventional top seals may collect debris because of the width of the sides. The debris can be transferred between the sealing surface of the top seal and the corresponding surface of the gate during operation of the gate. The debris can abrade the surface of the top seal and the surface of the gate causing a leak path or reducing the life of the top seal.

Conventional side seals may comprise a plurality of parts which must be adjusted in relation to one another to urge the pair of seal members into sealed engagement against the opposed faces of the gate. Because conventional seals require adjustment of a plurality of parts to seal and do not seal by self conforming to the opposed faces of the gate, installation and maintenance costs of conventional side seals can be a substantial expense. Additionally, conventional side seals having a plurality of parts may also provide a corresponding plurality of leak paths between the parts. Moreover, the structure of conventional side seals may transfer the forces of seating and unseating head to the fasteners which maintain the spatial relation of the plurality of parts rather than the structure of the vertical frame members.

Conventional bottom seals can be disposed in fixed relation within the bottom channel of the bottom horizontal frame member by application of an amount bonding agent. However, over time the continued compression of the bottom seal by engagement with bottom edge of the gate, as well as action of chemical agents in the fluid that passes through the slide gate, can cause the bonding agent to release. The bottom seal may then become in part or in whole displaced from the bottom channel of the bottom horizontal frame member.

Additionally, conventional top seals terminate at each end face in substantially perpendicular butting engagement with the end face of a side seal member. As a result, deflection of the end face of the top seal occurs substantially parallel with the flow of fluid through the slide and deflection of the side seal member occurs substantially perpendicular to the flow of fluid through the slide gate resulting in separation of the abutted surfaces and production of a corresponding leak path.

The instant invention provides slide gate seals and a seal system which overcomes in whole or in part certain of the forgoing disadvantages of conventional slide gate seals.

II. SUMMARY OF THE INVENTION

Accordingly, a broad object of the invention can be to provide a seal system for a slide gate which self adjusts or self conforms into sealing relation with the corresponding face of the gate, thereby eliminating manual adjustment of the top seal and side seal in relation to the gate face to form a fluid seal.

Another substantial object of the invention can be to provide a one piece top seal for a slide gate having a sealing member which self adjusts or self conforms into sealed relation with the corresponding face of the gate and further provides a shield member adapted to contact the face of the gate above the sealing member to shed debris away from the face of the gate and to prevent ingress of debris between the sealing member and the face of the gate. Additionally, the shield member can operate with lesser frictional drag than conventional seals and correspondingly reduces the lifting force required in operation of the slide gate.

Another substantial object of the invention can be to provide a one piece side seal which has a reduced number of leak paths, and lesser installation and maintenance costs. The one piece side seal can also have a configuration which self adjusts or self conforms into sealing relation with the corresponding face of the gate, thereby eliminating manual adjustment of the side seal in relation to the gate face to generate a fluid tight seal.

Another substantial object of the invention can be to provide a one piece bottom seal which includes fixation members which assist in maintaining fixed relation between the bottom seal and the bottom frame member, even upon failure of the bonding agent between the bottom seal and the bottom frame member.

Naturally, further objects of the invention are disclosed throughout other areas of the specification, drawings, photographs, and claims.

III. A BRIEF DESCRIPTION OF THE DRAWINGS

IV. DETAILED DESCRIPTION OF THE PREFERRED EMBODIMENTS

Figure 1:
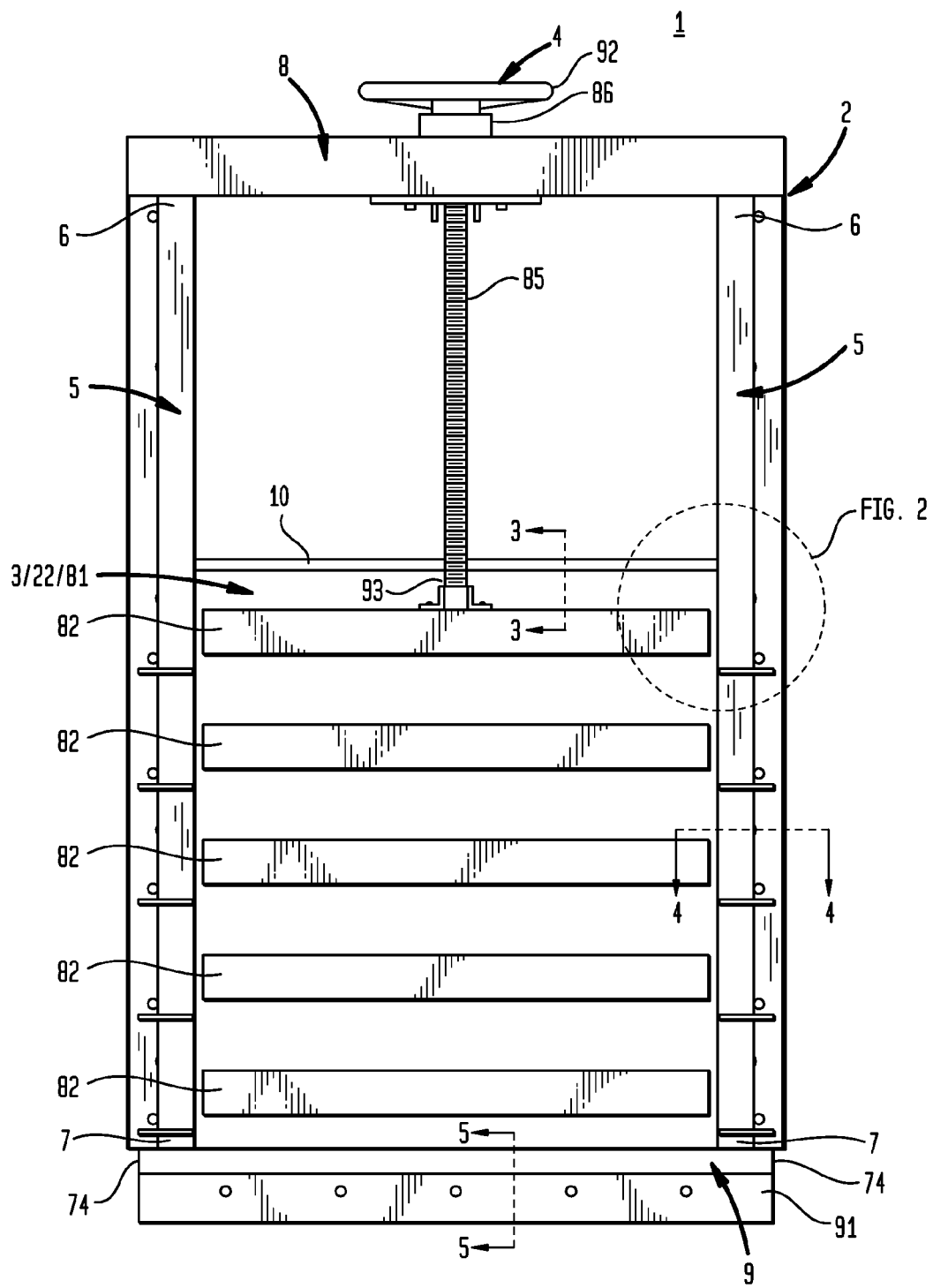
FIG. 1 is front elevation view of a particular embodiment of a slide gate.

Now referring primarily to FIG. 1, an exemplary slide gate (1) includes a frame assembly (2), a gate (3), and a gate operator (4). The frame assembly (2) includes a pair of gate guide members (5) disposed in substantially parallel relation a distance apart each having a length between a first end (6) and a second end (7), a top frame member (8) coupled between the pair of gate guide members (5) proximate the first ends (6), a bottom frame member (9) coupled between the pair of gate guide members (5) proximate second ends (7), and an intermediate cross member (10) coupled between the pair of gate guide members (5) at a height between the bottom frame member (9) and the top frame member (8).

Figure 2:
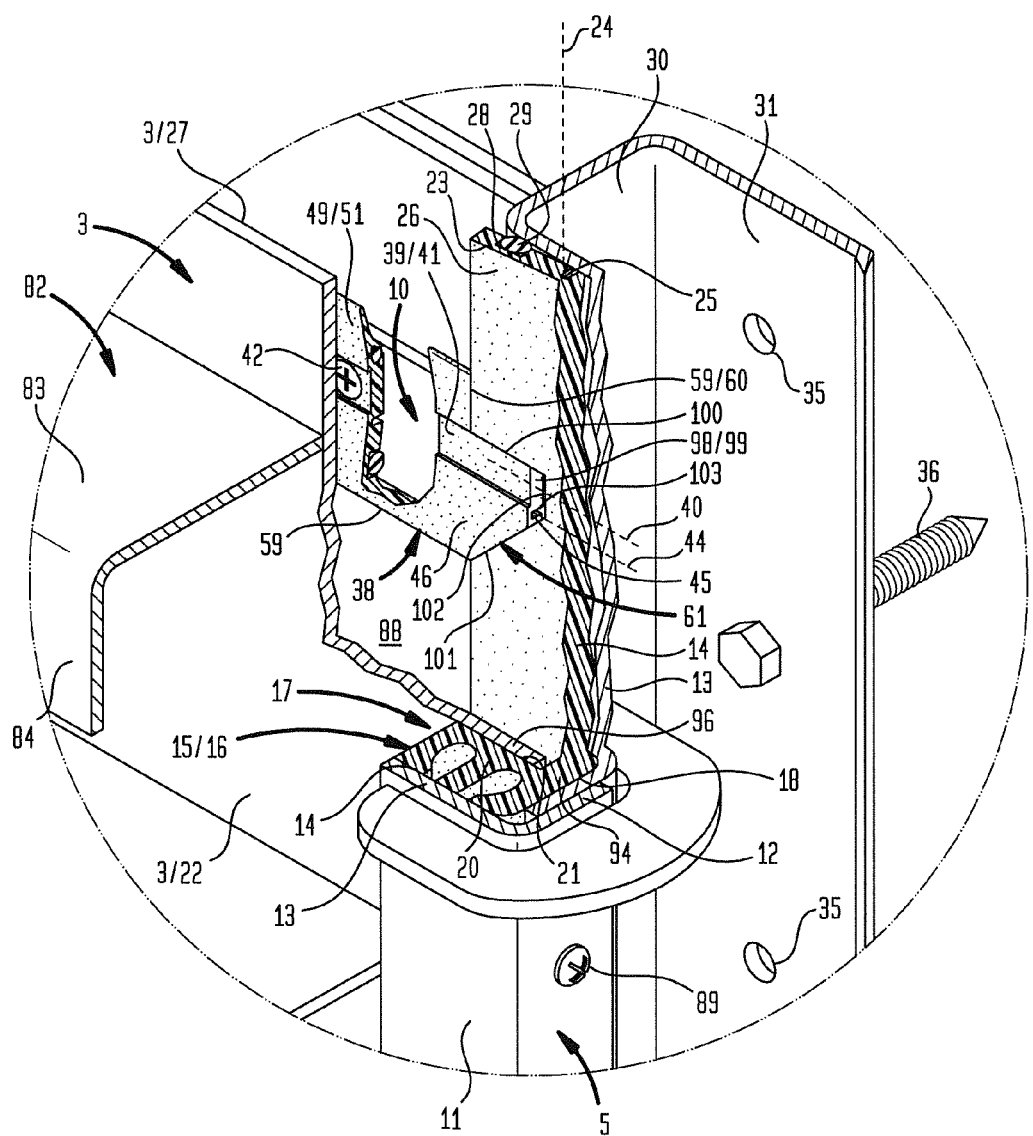
FIG. 2 is a partial cut away view of the embodiment of the slide gage shown in FIG. 1.
Figure 4:
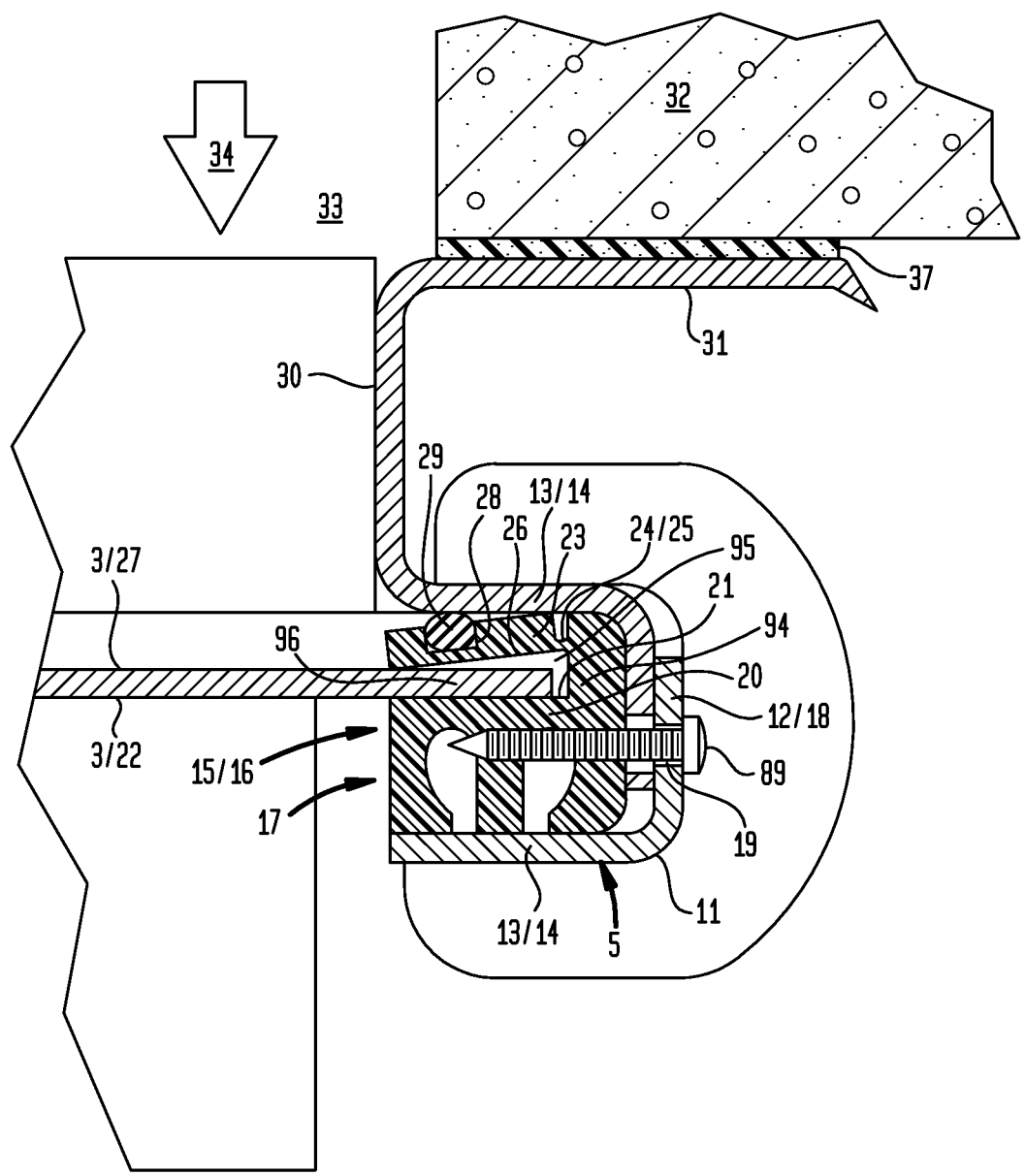
FIG. 4 is cross-section view 4-4 of a particular embodiment of a side seal.

Now referring primarily to FIGS. 2 and 4, each of the pair of gate guide members (5) in part include a side channel element (11) (which can be formed as a single piece or by coupling of two pieces as shown in FIG. 2) defined by a bottom wall (13) and a pair of side walls (12). The pair of side walls (13) coupled to the bottom wall (12) dispose a pair of side wall faces (14) in substantially parallel opposed relation a distance apart to define a channel passageway (15). The open side (16) of each of the pair of channel elements (11) can be disposed in inwardly facing relation. A side seal (17) can be received within the channel passageway (15) in a continuous length between the first end (6) and the second end (7) (or sufficient length) of each of the pair of gate guide members (5).

Each of the pair of side seals (17) can be molded, formed, or otherwise fabricated as one piece using high molecular weight polyethylene, or a similar material. As shown by the example of FIG. 4, each of the pair side seals (17) can have external dimensions sufficient to engage the side wall faces (14) and the bottom wall face (18) of the bottom wall (12) of the side channel element (11). The side seal (17) can be held in fixed relation within the channel passageway (15) by frictional forces of the engaged faces (14)(18), or alternately, as shown in FIG. 4, the side channel element (11) can further include a plurality of holes (19) (see for example FIG. 4) each of which can receive a mechanical fastener (89) (such as a threaded fastener) that can engage the side seal (17) maintaining the side seal (17) in fixed relation in the side channel element (11).

The one-piece side seal (17) held in fixed relation in the channel element (11) affords a static sealing member (20) having a static sealing face (21) and a hinged sealing member (23) having a positionable sealing face (26). The static sealing member (20) and the hinged sealing member (23) project from a base (94) to define a side seal channel (95) between the static sealing face (21) and the positionable sealing face (26) for receiving a side margin (96) of the gate (3). The hinged sealing member (23) can rotate about an axis (24) of a hinge element (25) (such as a living hinge) coupled to the base (94) to decrease the width of the side seal channel (95) to engage the positionable sealing face (26) against the second gate face (27) of the gate (3) and to engage the static sealing face (21) against a first gate face (22) of the gate (3).

A groove element (28) can be disposed along the length of the hinged sealing member (23) in opposed relation to a corresponding one of the side wall faces (14) of the side channel element (11)(or other part of the frame assembly (3)). A resilient member (29) can be disposed inside the groove element (28) (or maintained in the groove element (28) by application of a bonding agent). The resilient member (29) by contact with the external surface of one of the side wall faces (14) (or other part of the frame assembly (3)) can generate rotation in the hinged sealing member (23) about the hinge element (25) to forcibly urge the positionable sealing face (26) against the second gate face (27) of the side margin (96) of the gate (3).

Embodiments of the side seal (17), as above described, can self conform or self adjust to minor changes in the location of the second gate face (27) in relation to the positionable sealing face (26) without adjustment or movement of the sidewall faces (14) of the side channel element (11), or manual adjustments to change the configuration of the side seal (17) as required by conventional side seals. The dimensions or resiliency (or both the dimensions and resiliency) of the resilient member (29) can be increased or decreased depending upon the application to allow the self adjusting operation of the side seal (17) and the force with which the positionable sealing face (26) engages the second gate face (27). The resilient member (29) can for example include a rubber or plastic cord having solid substantially circular cross-section; however, the invention is not so limited, and the resilient member (29) can be more or less circular in cross-section, have a greater or lesser resiliency, or be tubular to provide a tubular side wall of greater or lesser thickness, each depending upon the application.

Now referring primarily to FIG. 4, each of the pair of gate guides (5) as to particular embodiments can further include a bracket member (30) coupled to each side channel element (11). The bracket member (30) can be configured to provide a flange (31) adapted to mount or anchor the frame assembly (2) to the fluid retaining walls (32) which define a fluid passageway (33) or channel through which an amount of fluid (34) flows such that substantially all of the fluid (34) flows through the frame assembly opening (88). Typically, the flange (31) provides a plurality of holes (35) through which mechanical fasteners (36) are disposed for anchoring the frame assembly (2) in relation to the fluid retaining walls (32). A seal element (37) (for example a gasket or an amount of grout) can be disposed between the flange (31) and the fluid retaining walls (32) to form a substantially watertight connection between the flange (31) and the fluid retaining walls (32). Although the illustrated embodiment has a single elongate bracket member (30) coupled along the length of each channel element (11), the bracket member (30) can take the form of one or more brackets spaced along the length of each channel element (11), such as one or more L-shaped brackets or the like. Understandably, depending on the configuration of the fluid retaining walls (32), the fluid passageway (33) which can take the form of an opening in the fluid retaining walls (32) as shown, or as an example can take the form of fluid outlet disposed in the fluid retaining walls (32) such as an outlet pipe, the appropriate mounting hardware can be correspondingly selected as is well known by a person of ordinary skill in the art.

Figure 3:
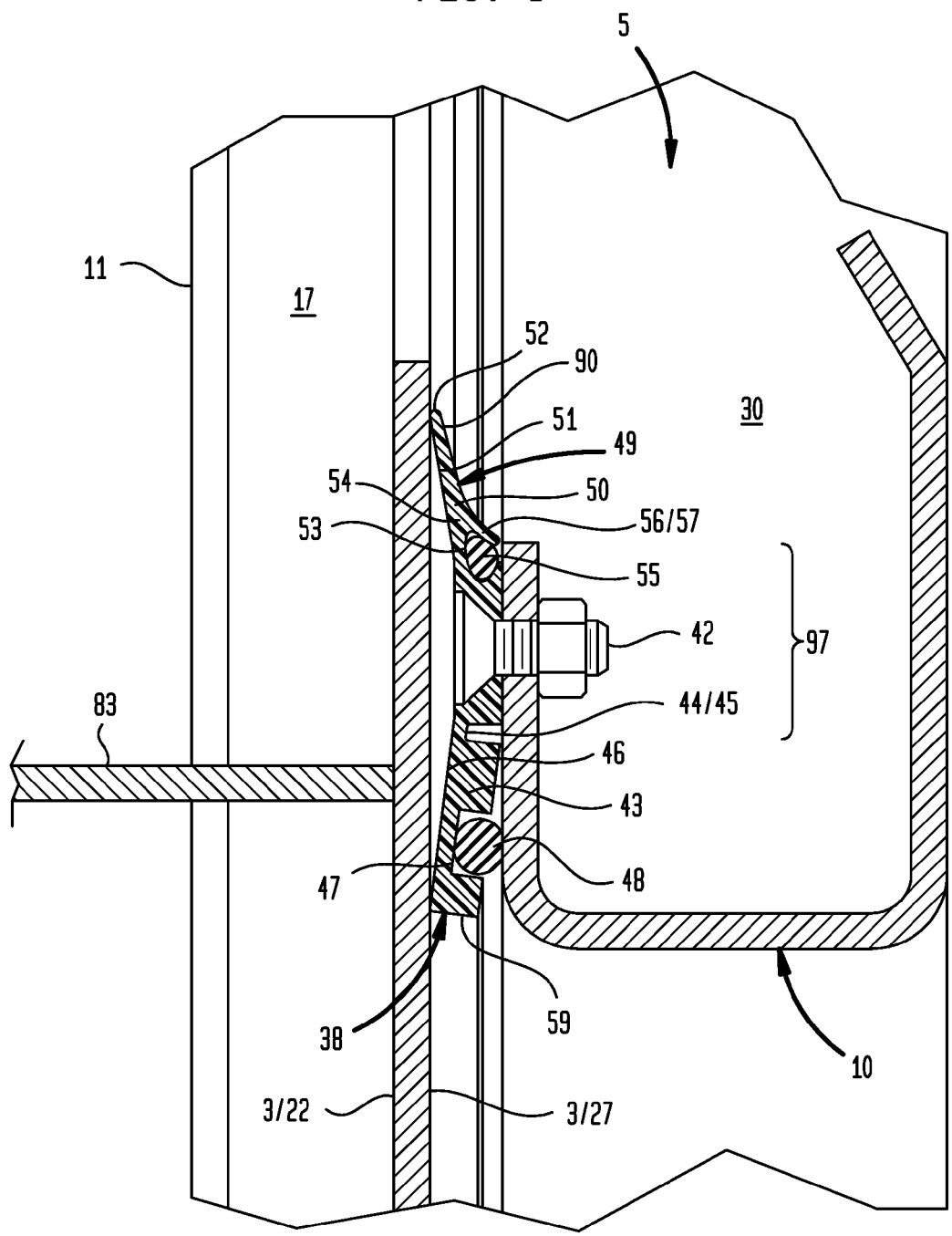
FIG. 3 is cross-section view 3-3 of a particular embodiment of a top seal.

Now referring primarily to FIGS. 2 and 3, the intermediate cross member (10) can be coupled between the pair of gate guide members (5) at a height between the bottom frame member (9) and the top frame member (8). A top seal (38) can be secured to the intermediate cross member (10) between the opposed side seals (17) (see for example FIG. 2). The top seal

(38) can include longitudinal medial portion (97) securable to the intermediate cross member (97). The longitudinal medial portion (97) can further include a recess element (39) disposed proximate the longitudinal midline (40) that runs the length of the top seal (38) between the side seals (17). As to particular embodiments, the recess (41) can receive a plurality of top seal mechanical fasteners (42) (such as flat head screws) having spaced engagement to couple the top seal (38) in fixed relation with the intermediate cross member (10). The top seal (38) further includes a hinged sealing member (43) similar to the hinged sealing member above described for the side seal (17) which rotates about an axis (44) of a hinge element (45)(which can be take the form of a living hinge) coupled along a first side of the longitudinal medial portion (97) between the side seals (17). The hinge element (45) can be disposed proximate the bottom of the recess element (39). Rotation of the hinged sealing member (43) about the axis (44) of the hinge element (45) can engage a positionable sealing face (46) against the second gate face (27) of the gate (3), in similar fashion to the side seals (17), as above described. A groove element (47) can be disposed along the length of the hinged sealing member (43) in opposed relation to the external surface of the intermediate cross member (10). A resilient member (48), as above described, can be received inside the groove element (46) (or maintained in the groove element (46) by application of a bonding agent). The resilient member (48) by contact with the external surface of the intermediate cross member (10) can generate rotation in the hinged sealing member (43) about the hinge element (45) to forcibly urge the positionable sealing face (46) against the second gate face (27). To increase the force of engagement between the positionable sealing face (46) and the second gate face (27), the dimensions or resiliency (or both the dimensions and resiliency) of the resilient member (48) can be increased or decreased, similar to that described for the resilient member utilized with the side seal (17). The positionable sealing face (46) of the top seal (38) provides a self adjusting or conforming operation to the top seal (38) as described for the side seals (17).

The top seal (38) can further include a shield member (49) coupled proximate the recess element (39) which runs the length of the top seal (38) between the opposed side seals (17). The shield member (49) includes a contact member (50) which upwardly extends in relation to the recess element (39) and provides a contact face (51) which engages the second gate face (27) at a distance above the hinged sealing member (43) of the top seal (38). The contact face (51) sufficiently contacts the second gate face (27) to prevent, reduce, inhibit or impede ingress of debris (particulate, plant parts, or the like) between the positionable sealing face (46) of the hinged sealing member (43) and the second gate face (26) to protect the integrity of the seal material of the positionable sealing face (46) and the second gate face (27) to lessen wear and increase the life of the hinged sealing member (43). The non-sealing face (90) of the contact member (50) can provide a taper, slope, or otherwise be adapted to shed debris away from the second gate face (27). As to particular embodiments as shown in FIG. 3, the shield member (49) can taper toward the second gate face (27) as it upwardly extends in relation the recess element (39) to provide a terminal edge (52) sufficiently thin to avoid, reduce, or inhibit accumulation of debris material on the top seal (38) shed from the second gate face (27) and can further operate to scrape debris from the second gate face (27) as the gate (3) lowers.

Particular embodiments of the contact member (50) can further include a groove element (53) proximate the base (54) of the contact member (50) which runs the length of the top seal (38) between the opposed side seals (17). The groove element (53) can be located such that the external surface of the intermediate cross member (10) retains a resilient member (55) in the groove element (53) (or maintained in the groove element (53) by application of a bonding agent), as above described for the side seal (17) and top seal (38) hinged sealing members (23)(43).

Particular embodiments of the contact member (50) can further include a cantilever element (56) which can be anchored at a first end (57) proximate the base (54) of the contact member (51) and adapted to extend downwardly and outwardly over the groove element (53). The cantilever element (56) can engage the resilient member (55) located in the groove element (53). Force applied to the cantilever element (56) by the resilient means (53) forcibly urges the contact face (51) against the second gate face (27). The force of engagement between the contact face (51) and the second gate face (27) can be increased or decreased by altering the dimensions and resiliency of resilient member (55) inserted in a groove element (53). Typically, the contact face (51) does not act to seal a leak path and therefore the force of the contact face (51) against the second gate face (27) can be reduced, or be sufficient to allow the contact member (50) to shed debris, and thereby a correspondingly lowering the amount of lifting force required to lift the gate (3) affording an advantage over conventional top seals.

Now referring primarily to FIG. 2, a first end (98) and a second end (99) of the top seal (38) can join the side seals (17) in abutted relation. As to the preferred embodiment shown in FIG. 2, the top seal (38) can be configured to abuttingly engage a terminal end (60) of the shield member (49) against the hinged sealing member edge (59) of a corresponding one of said side seals (17). The longitudinal medial portion (97) and the hinged sealing member (43) of the top seal (38) longitudinally extend outward of the abutted engagement of the terminal edge (59) of the shield member (49) against the hinged sealing member edge (59) of each said side seal (38), the shield member (49) can be removed from the longitudinal medial portion (97) extending outward provides a linear medial portion edge (100) and the hinged sealing member extending outward having an angled edge (101) commencing proximate the hinge element (45) and terminating at the hinged sealing member edge (59). The hinged sealing member (23) of each side seal having a closed end recess element (61) which receives the extending portion of the longitudinal medial portion (97) and the hinged sealing member (43). The edges of the closed end recess element (61) can be configured to abuttingly engage the medial portion edge (100) and the angled edge (101). The closed end recess element (61) can have a depth sufficient to provide a gap (102) between each of said first end (98) and said second end (99) of said top seal and a closed end (103) of a corresponding one of said closed end recess elements (61). Joining the hinged sealing member (43) of the top seal (38) to the hinged sealing member (23) of the side seal (17) in angled abutted relation provides an advantage over conventional perpendicular abutted engagement in reducing potential leak paths between the side seal (17) and the top seal (38).

Figure 5:
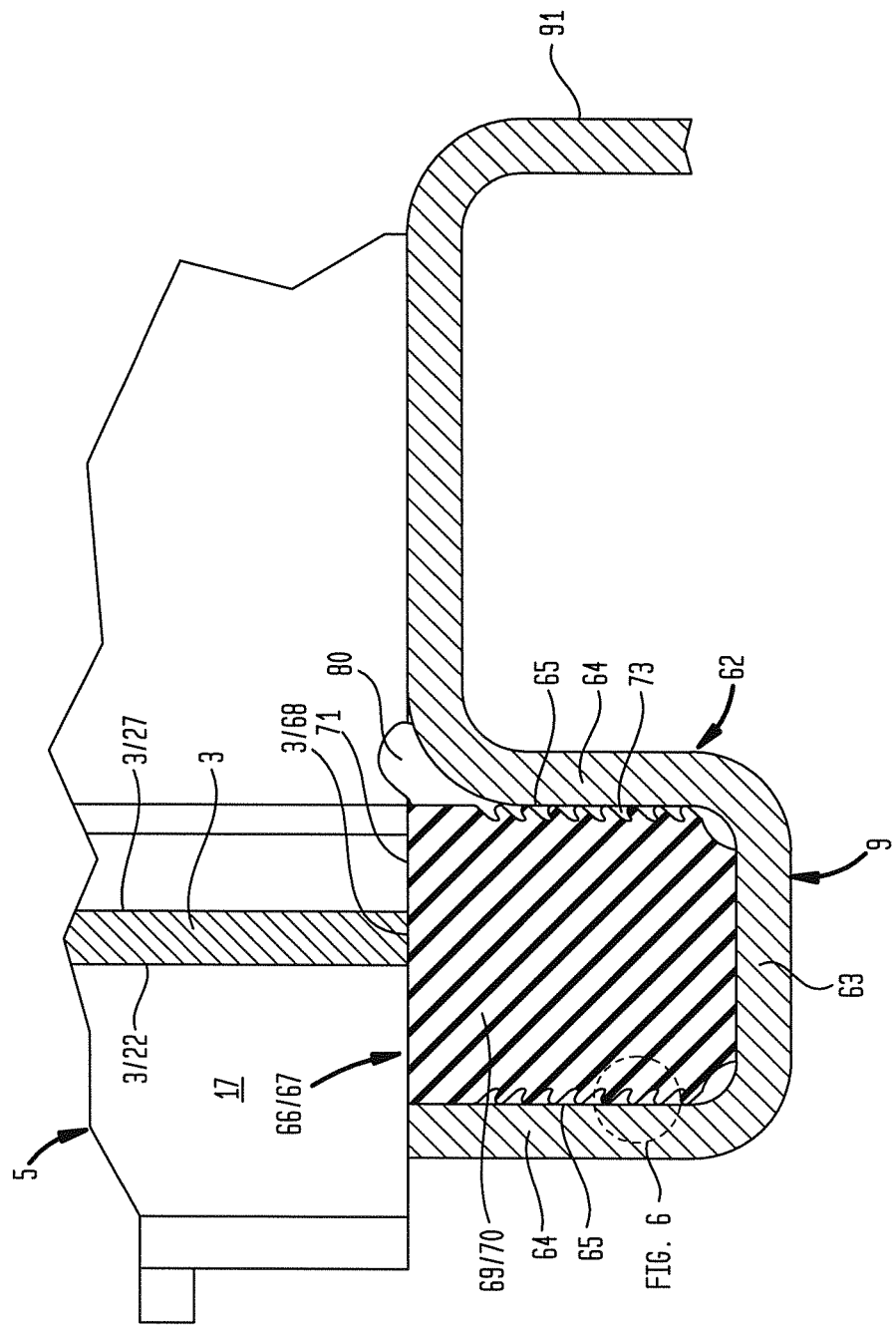
FIG. 5 is cross-section view 5-5 of a particular embodiment of a bottom seal.

Now referring primarily to FIGS. 1 and 5, the bottom frame member (9) can in part provide a bottom channel element (62) including a bottom wall (63) coupled to a pair of side walls (64). The pair of side walls (64) providing a pair of faces (65) disposed in opposed relation a distance apart defines a bottom channel passageway (66). The bottom frame member (9) coupled between the pair of gate guide members (5) can dispose the open side (67) of the bottom channel element (62)

upwardly facing and aligned to receive the bottom edge (68) of the gate (3) between the pair of faces (65) of the pair of side walls (64).

Now referring primarily to FIG. 5, a bottom seal (69) can provide a bottom seal body (70) which can be established inside of the bottom channel passageway (66) and adapted to provide a sealing face (71) which can continuously engage the bottom edge (68) of the gate (3). The external side surfaces (73) of the bottom seal body (70) can further include one or more fixation members (72) which extend a sufficient distance outwardly from the external side surfaces (73) of the bottom seal body (70) to correspondingly contact the pair of faces (65) of the bottom channel element (62). The one or more fixation members (72) can be continuous or discontinuous between the opposed ends (74) of the bottom seal (69) and can be disposed as a plurality of fixation members (72) in vertical spaced relation on the external side surfaces (73) of the bottom seal body (70). As to particular embodiments, the plurality of fixation members (72) can extend outwardly a sufficient distance to require one or more of the plurality of fixation elements (72) to flex upwardly upon insertion of the bottom seal body (70) into the bottom channel passageway (66).

Figure 6:
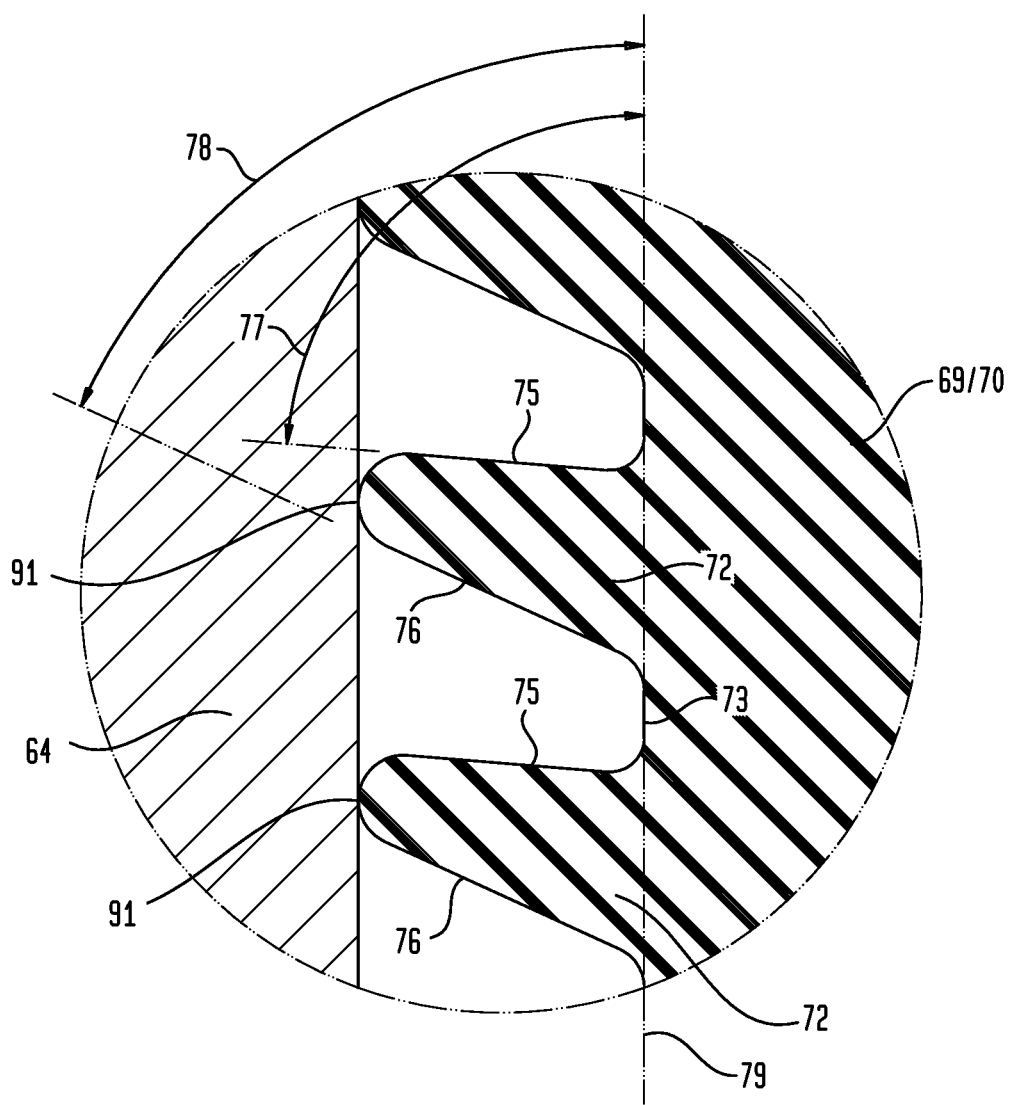
FIG. 6 is a partial enlarged view of the particular embodiment of the bottom seal shown in FIG. 5.

Now referring primarily to FIG. 6, particular embodiments of the bottom seal (69) can have a plurality of fixation members (72) disposed in vertically spaced parallel relation between the opposed ends (74) of the bottom seal (69). Each of the plurality of fixation members (72) can have a top member surface (75) and bottom member surface (76). The top member surface (75) can extend outwardly from the external side surface (73) of the bottom seal body (70) at an angle (77) that is greater in relation to the vertical face (79) of the bottom seal (69) than the angle (78) at which the bottom member surface (76) extends from the external bottom seal surface (73) to generate a taper in each of the plurality of fixation members (72). By adjusting the amount of taper, the terminal end (91) of each of the plurality of fixation members (72) to be located at a distance outward of the vertical face (79) of about 0.100 inch and about 0.200 inch from the external bottom seal surface (73) and having interterminal spacing of about 0.100 inch and about 0.150 inch. The illustrative embodiment shown in FIG. 6, shows each of the one or more fixation members (72) angled upwardly by establishing the angle of the top member surface (75) at an angle (77) of less than 90° in relation to the vertical center line (79). A preferred embodiment can have a top member surface (75) angle (77) in the range of about 75° about 90° and a bottom member surface (76) angle (78) in a range of about 55° to about 70°. The bottom seal (69) can be produced from neoprene or similar material having about a 40 durometer shore A or similar durometer. Embodiments of the bottom seal (69) as shown FIG. 6 can upon forcible urging be received within the bottom channel passageway (66) causing an amount of flexure in the plurality of fixation members (72) sufficient to resist egress of the bottom seal (69) from the bottom channel element (62). Additionally, an amount of bonding agent (80) can be disposed in the bottom channel passageway (66) to further secure the bottom seal (69) in the bottom channel passageway (66). Even in the event, that repeated engagement of the gate (3) with the sealing face (71) of the bottom seal (69) disrupts adherence of the boding agent (80 to the fixation members (72), the configuration of the bonding agent (80) and the fixation members (72) provides for an interdigitated relation which resists movement of the bottom seal (69) from the bottom channel element (62). The bottom frame member (9) can be secured to the fluid retaining wall (32) in the same or similar manner using brackets (81) as above described for use with the side channel elements (11).

Now referring primarily to FIG. 1, the gate (3) can be a substantially flat plate (81) which can further include a plurality of horizontal stiffener members (82) coupled to the first gate face (22) to increase rigidity of the gate (3). The stiffener members (82) can be in the form of a pair of legs (83)(84) disposed at a right angles (as shown for example in FIG. 2) and coupled by a first leg (83) to the first gate surface (22).

The top frame member (8) can in part support the gate operator (4) which moves the gate (3) vertically relative to frame assembly (2). While the embodiment of the gate operator (4) shown is in the form of a rising stem gate; the invention is not so limited and embodiments of the gate operator (4) can take the form of a non-rising stem gate or other constructional form which can operate to move the gate (3). Embodiments of the gate operator (4) can for example include a threaded stem (85) extending through top frame member (8). A hand wheel (92) which provides a threaded member can be journalled for rotation in housing (86) mounted to the top frame member (8). The threaded member can receive the threaded stem (85) secured at the lower end (93) to the gate (3). By rotation of the hand wheel (92), which correspondingly rotates the threaded member in relation to the threaded stem (85) in a first direction (86), the gate (3) can be raised upwards in relation to the bottom frame member (9) disengaging the bottom edge (68) of the gate (3) from the sealing face (71) of the bottom seal (69) to a position which allows an amount of fluid (34) to flow through the frame assembly opening (88) defined by the frame assembly (2). By rotation of the hand wheel (92) in a second direction (87), the gate (3) can be lowered within the frame assembly (2) to any selected height or until its bottom edge (68) engages the sealing face (71) of the bottom seal (69) supported within the bottom channel passageway (66).

As can be easily understood from the foregoing, the basic concepts of the present invention may be embodied in a variety of ways. The invention involves numerous and varied embodiments of a gate seal system which can be incorporated into a wide variety of sliding gates, or similar applications.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a seal" should be understood to encompass disclosure of the act of "sealing"—whether explicitly discussed or not—and, conversely, were there effectively disclosure of the act of "sealing", such a disclosure should be understood to encompass disclosure of "seal" and even a "means for sealing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a seal" refers to one or more of those seals. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

Thus, the applicant(s) should be understood to claim at least: i) each of the seals herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention(s) that may be claimed. The applicant does not waive any right to develop further claims based upon the description set forth above as a part of any continuation, division, or continuation-in-part, or similar application.

We claim:

1. A slide gate, comprising:
   (a) a frame assembly including:
      i) a first gate guide member and a second gate guide member each having a length disposed between a first end and a second end, said gate guide members defining corresponding side channel elements;
      ii) an intermediate cross member coupled between said gate guide members at a height between said first ends and said second ends;
   (b) a gate extending between said first gate guide member and said second gate guide member, said gate having corresponding side margins having sliding engagement with said side channel elements;
   (c) an elongate side seal disposed in each of said side channel elements, including
      a static sealing member having a static sealing face and a hinged sealing member having a positionable sealing face, said static sealing member and said hinged sealing member projecting from a base defining a channel between said static sealing face and said hinged sealing member for receiving said side margin of said gate
   (d) an elongate top seal coupled to said intermediate cross member, said elongate top seal including:
      i) a longitudinal medial portion secured to said intermediate cross member;
      ii) a hinged sealing member coupled by a hinge element along a first side of said longitudinal medial portion, said hinged sealing member providing a positionable sealing face movable about said hinge element to engage said face of said gate below said longitudinal medial portion; and
      iii) a shield member coupled along a length of a second side of said longitudinal medial portion which tapers approaching a terminal edge, and further including:
         a contact face configured to engage said face of said gate;
         a groove element disposed along said length of said shield member in opposed relation to said to said intermediate cross piece;
         a cantilever element coupled to said shield member extending over said groove element; and
         a resilient member disposed in said groove element, said resilient member engaging said cantilever element to urge said contact face against said face of said gate.

2. The slide gate of claim 1, wherein said side channel elements of said frame assembly have fixed dimensional relations, and wherein said one piece side seal is disposed in said side channel elements.

3. The slide gate of claim 1, further comprising a recess element disposed along a length of said longitudinal medial portion of said elongate top seal, said recess element configured to receive within one or more mechanical fasteners in space engagement to secure said longitudinal medial portion to said intermediate cross piece.

4. The slide gate of claim 1, wherein said elongate top seal coupled to said intermediate cross member has a first end and a second end which abuttingly engage a corresponding one of said elongate side seals disposed in said side channel elements, said first end and said second end of said elongate top seal configured to abuttingly engage said shield member against said hinged sealing member edge of a corresponding one of said elongate side seals, said longitudinal medial portion and said hinged sealing member of said elongate top seal longitudinally extending outward of abutted engagement of said shield member against said hinged sealing member of each said elongate side seal, said longitudinal medial portion extending outward having a medial portion edge, said hinged sealing member extending outward having an angled edge commencing proximate said hinge element and terminating at said hinged sealing member edge, said hinged sealing member of each said elongate side seal having a closed end recess element which receives said longitudinal medial portion and said hinged sealing member extending outwardly, said recess element configured to abuttingly engage said medial portion edge and said angled edge.

5. The slide gate of claim 4, wherein said closed end recess element has a depth which provides a gap between each of said first end and said second end of said elongate top seal and a closed end of a corresponding one of said closed end recess elements.

6. A method of producing a slide gate, comprising:
(a) providing a frame assembly including:
 i) a first gate guide member and a second gate guide member each having a length disposed between a first end and a second end, said gate guide members defining corresponding side channel elements;
 ii) an intermediate cross member coupled between said gate guide members at a height between said first ends and said second ends;
(b) extending a gate between said first gate guide member and said second gate guide member, said gate having corresponding side margins having sliding engagement with said channel elements;
(c) disposing an elongate side seal in each of said side channel elements, including:
 a static sealing member having a static sealing face and a hinged sealing member having a positionable sealing face, said static sealing member and said hinged sealing member projecting from a base defining a channel between said static sealing face and said hinged sealing member for receiving said side margin of said gate, said hinged sealing member movable about a hinge element coupled to said base to decrease a width of said channel;
(d) coupling an elongate top seal to said intermediate cross member, said elongate top seal including:
 i) a longitudinal medial portion secured to said intermediate cross member;
 ii) a hinged sealing member coupled by a hinge element along a first side of said longitudinal medial portion, said hinged sealing member providing a positionable sealing face movable about said hinge element to engage a face of said gate below said longitudinal medial portion; and
 iii) a shield member coupled along a length of a second side of said longitudinal medial portion which tapers approaching a terminal edge, and further including:
  a contact face configured to engage said face of said Gate;
  a groove element disposed along said length of said shield member in opposed relation to said to said intermediate cross piece;
  a cantilever element coupled to said shield member extending over said groove element; and
 a resilient member disposed in said groove element, said resilient member engaging said cantilever element to urge said contact face against said face of said gate.

7. The method of claim 6, wherein said side channel elements of said frame assembly have fixed dimensional relations, and wherein said one piece side seal is sufficiently flexible to be disposed in said side channel elements.

8. The method of claim 6, further comprising adjusting dimensional relations and an amount of resiliency of said resilient member alter the force of engagement of said contact face against said face of said gate.

9. The method of claim 6, further comprising a recess element disposed along a length of said longitudinal medial portion of said elongate top seal, said recess element configured to periodically receive within one or more mechanical fasteners to secure said longitudinal medial portion to said intermediate cross piece.

10. The method of claim 6, further comprising abuttingly engaging a first end and a second end of said elongate top seal coupled to said intermediate cross member to a corresponding one of said side seals disposed in said side channel elements, said first end and said second end of said elongate top seal configured to abuttingly engage said shield member against said hinged sealing member edge of a corresponding one of said side seals, said longitudinal medial portion and said hinged sealing member of said elongate top seal longitudinally extending outward of abutted engagement of said shield member against said hinged sealing member of each said side seal, said longitudinal medial portion extending outward having a medial portion edge, said hinged sealing member extending outward having an angled edge commencing proximate said hinge element and terminating at said hinged sealing member edge, said hinged sealing member of each side seal having a closed end recess element which receives said longitudinal medial portion and said hinged sealing member extending outwardly, said recess element configured to abuttingly engage said medial portion edge and said angled edge.

11. The method of claim 10, wherein said closed end recess element has a depth which provides a gap between each of said first end and said second end of said elongate top seal and a closed end of a corresponding one of said closed end recess elements.

* * * * *